(12) United States Patent
Duane

(10) Patent No.: US 7,367,670 B2
(45) Date of Patent: May 6, 2008

(54) EYEWEAR BOTTLE OPENER

(76) Inventor: Travis E. Duane, 2112 Columbia Dr., Flower Mound, TX (US) 75022

( * ) Notice: Subject to any disclaimer, the term of this patent is extended or adjusted under 35 U.S.C. 154(b) by 0 days.

(21) Appl. No.: 11/691,567

(22) Filed: Mar. 27, 2007

(65) Prior Publication Data

US 2007/0229755 A1 Oct. 4, 2007

Related U.S. Application Data

(60) Provisional application No. 60/744,001, filed on Mar. 30, 2006.

(51) Int. Cl.
*G02C 1/00* (2006.01)

(52) U.S. Cl. ............... 351/158; 351/41; 351/121

(58) Field of Classification Search ............... 351/158, 351/41, 121, 111; 215/400; 7/170, 169, 7/128, 151, 158; 362/119, 800
See application file for complete search history.

(56) References Cited

U.S. PATENT DOCUMENTS

| 4,238,862 A * | 12/1980 | Leatherman | 7/128 |
| 6,273,582 B1 * | 8/2001 | Taggart et al. | 362/119 |
| 7,073,918 B1 * | 7/2006 | Bauman | 362/119 |

\* cited by examiner

*Primary Examiner*—Hung X. Dang
(74) *Attorney, Agent, or Firm*—Michael A. O'Neil

(57) ABSTRACT

An eyewear bottle opener wherein a bottle opener is housed within the reinforced earpiece of the frame of the eyewear for the convenience of a person wearing the eyewear and desiring to open a bottle having a metal cap.

14 Claims, 4 Drawing Sheets

EYEWEAR BOTTLE OPENER

CROSS-REFERENCE TO RELATED APPLICATION

This application claims priority based on provisional patent application Ser. No. 60/744,001 filed Mar. 30, 2006, the entire content of which is incorporated herein by reference.

TECHNICAL FIELD

This invention relates to the fields of eyewear and bottle openers.

BACKGROUND AND SUMMARY OF THE INVENTION

Eyewear, and more particularly the type referred to as eyeglasses, is well known in the prior art. Eyewear typically comprises lenses and a frame, wherein the frame positions the lenses in front of the user's eyes and has earpieces that hold the frame in place. It is well known to vary the tint of the lenses and the style and material of the frames.

Bottle openers are also well known in the prior art. Typically bottle openers comprise a metal lever that is inserted below a metal bottle cap that is pleated about the rim of the neck of the bottle and then rotated about the bottle cap using a point on the cap as a fulcrum on which to pivot, thus pulling the bottle cap off of the rim of the bottle.

This invention combines eyewear and the type of bottle opener described above. The invention provides convenience for persons wearing eyewear, or eyeglasses, that desire to open bottles. In accordance with its narrower aspects, the invention comprises eyewear having a frame manufactured so as to house a bottle opener therein.

In one embodiment, the bottle opener is housed within the earpiece such that the opener is accessible from the top and near the hinge at which the earpiece joins the frame. The bottle opener is made from aluminum or a similarly rigid material of the like and includes an anchor piece that anchors the bottle opener within the earpiece and provides stability when used to open bottles. The earpiece is manufactured from plastic that is molded about the aluminum bottle opener and its anchor piece. Further, the hinge which connects the earpiece to the frame is reinforced with six to ten joints to absorb the stress incurred when the bottle opener is used to open bottles.

The bottle opener is also housed in the earpiece such that the lever is accessible from the bottom or from the side as well as near the end which is placed about the user's ear. In another embodiment the bottle open is housed in the nosepiece of the eyewear. In another embodiment the bottle opener is attached to the ear piece of the eyewear via a magnet or other means. In yet another embodiment the bottle opener is housed within the ear piece such that it is rotatable out of the housing for use.

BRIEF DESCRIPTION OF THE DRAWINGS

A more complete understanding of the present invention may be had by reference to the following Detailed Description when taken in connection with the accompanying Drawings, wherein.

DETAILED DESCRIPTION

Figure 1:
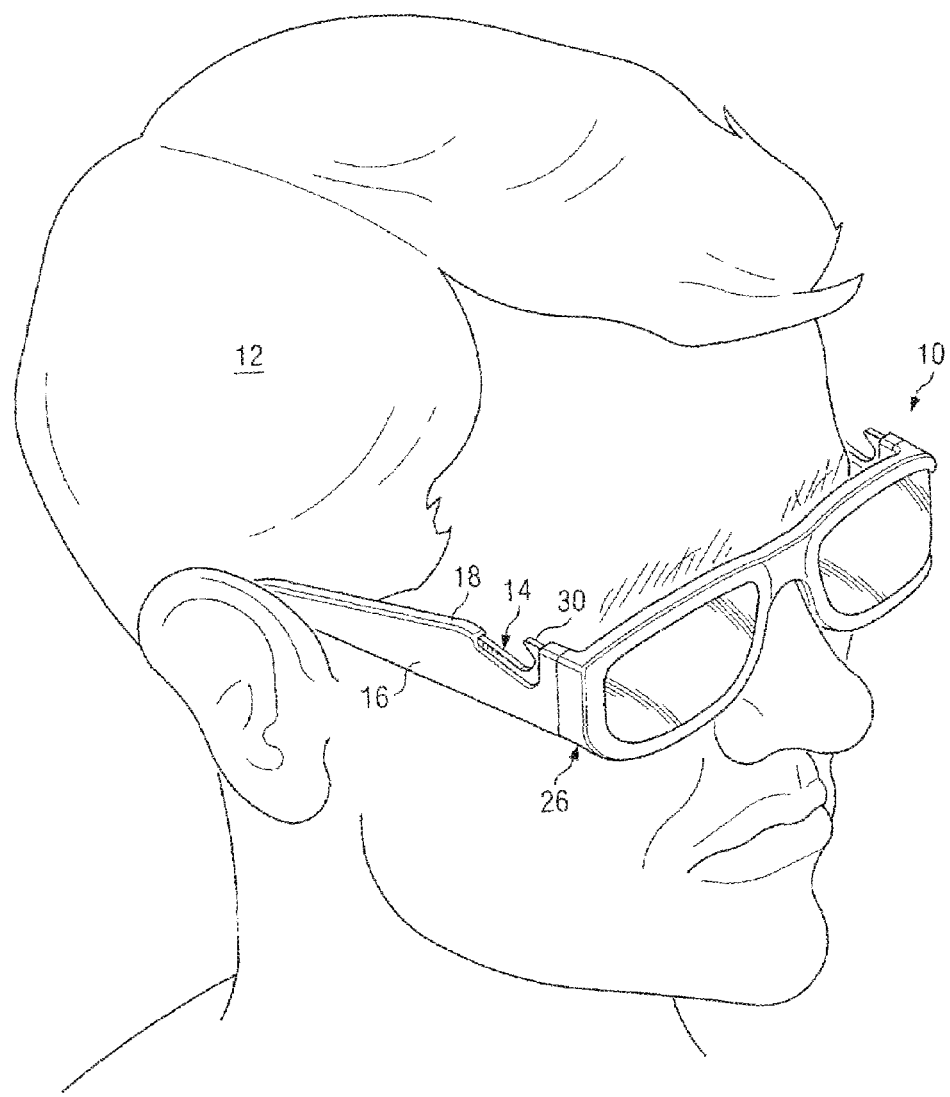
FIG. 1 is a perspective view illustrating one embodiment of the invention being worn by an individual.

Referring to the drawings, and in particular to FIG. 1, there is shown a perspective view of a first embodiment of the eyewear bottle opener 10 being used by an individual 12. In this embodiment the bottle opener 14 is housed within the earpiece 16 of the frame 26 near the hinge 28 of the frame 26 so that the lever 30 of the bottle opener 14 is accessible from the top 18 of the earpiece 16.

Figure 2:
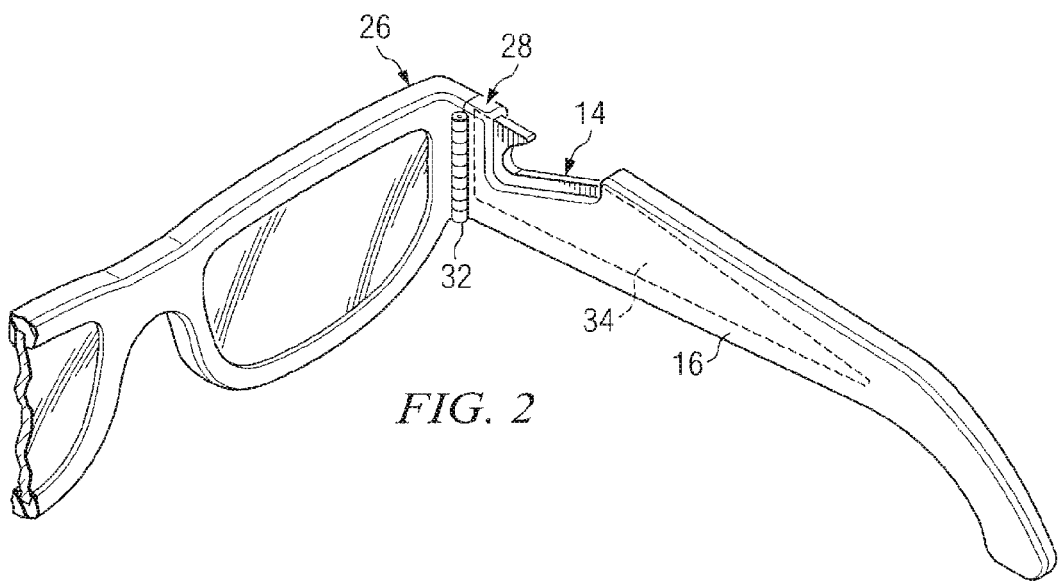
FIG. 2 is a rear perspective view illustrating the embodiment of FIG. 1 wherein the bottle opener is positioned to be accessed from the top of the ear piece.

FIG. 2 is a rear perspective view of the embodiment of FIG. 1. The bottle opener 14 is shown positioned near the hinge 28. The hinge 28 is reinforced by nine joints 32. The hinge 32 can be reinforced by more or fewer joints as necessary. The bottle opener 14 is attached to an anchor 34, both of which are made from aluminum in this embodiment, that adds support to the earpiece 16 that is molded thereabout when the bottle opener 14 is used for its intended purpose. The bottle opener 14 and the anchor 34 can be made of other materials, such as varying metals or alloys. Proper materials for the construction of the bottle opener 14 and the anchor 34 will be well known to those having skill in the art. In this embodiment the frame 26 is made from plastic. The frame 26 can be made from other materials, such as metal, an alloy, or a ceramic material. Proper materials for the construction of the frame 26 will be well known to those having skill in the art.

Figure 3:
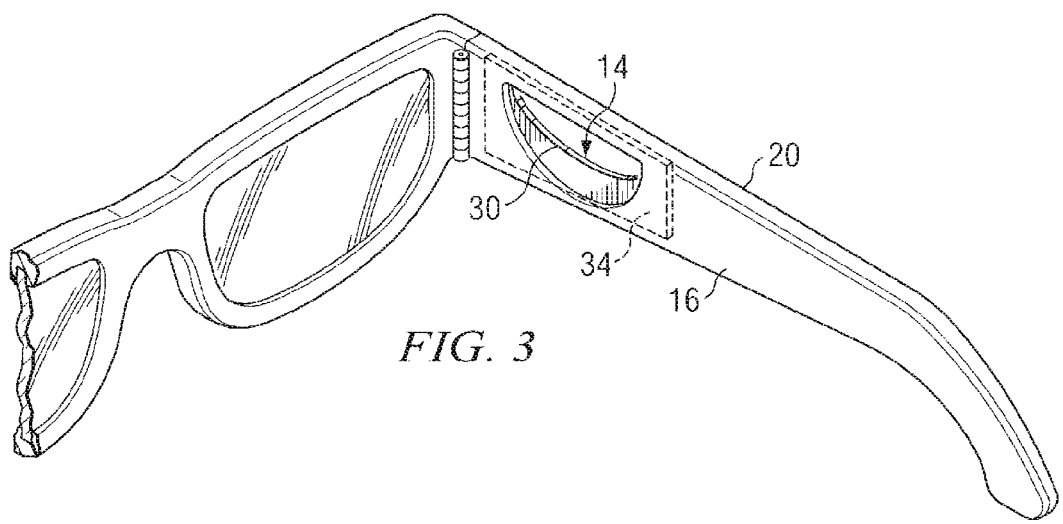
FIG. 3 is a rear perspective view illustrating the embodiment of FIG. 1 wherein the bottle opener is positioned to be accessed from the side of the ear piece.

FIG. 3 is a rear perspective view of the embodiment of FIG. 1 wherein the bottle opener 14 is positioned such that the lever 30 of the bottle opener 14 is accessible from the side 20 of the earpiece 16. The bottle opener 14 is attached to an anchor 34 in FIG. 3 as well.

Figure 4:
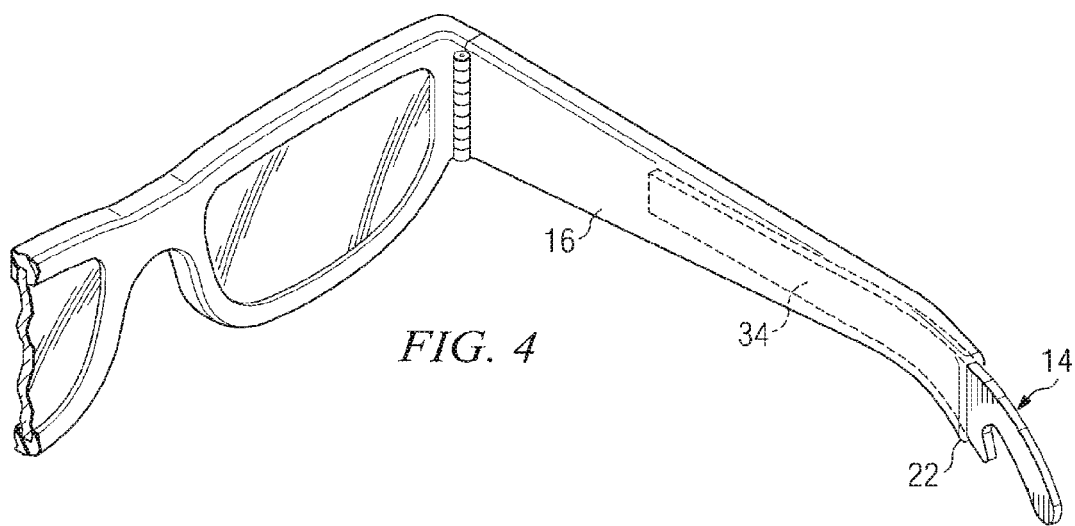
FIG. 4 is a rear perspective view illustrating the embodiment of FIG. 1 wherein the bottle opener is positioned to be accessed from the end of the ear piece that attached about an individual's ear.

FIG. 4 is a rear perspective view of the embodiment of FIG. 1 wherein the bottle opener 14 is positioned at the end 22 of the earpiece 16. The bottle opener 14 is shown attached to an anchor 34.

Figure 5:
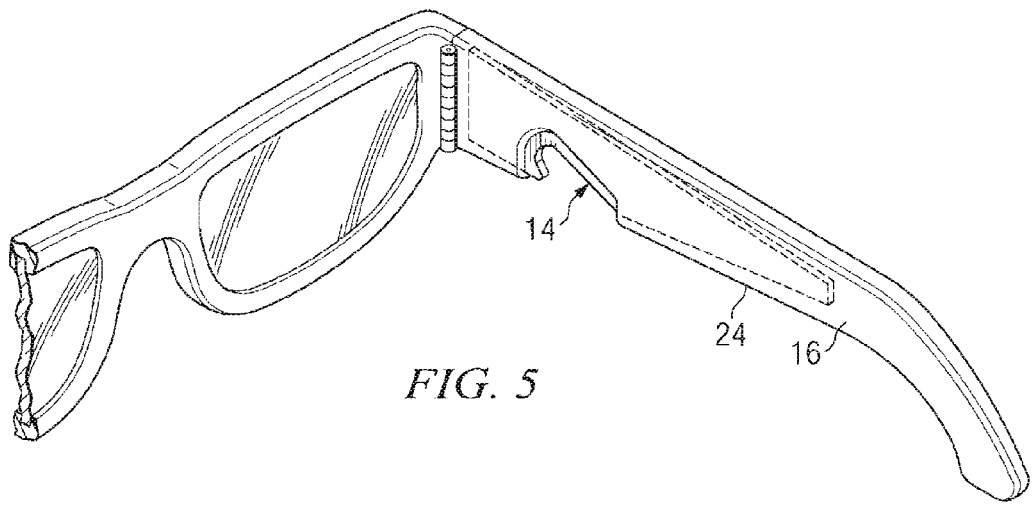
FIG. 5 is a rear perspective view illustrating the embodiment of FIG. 1 wherein the bottle opener is positioned to be accessed from the bottom of the ear piece.

FIG. 5 is a rear perspective view of the embodiment of FIG. 1 that is similar to the invention shown in FIG. 2 except that the bottle opener 14 is accessible from the bottom 24 of the earpiece 16.

Figure 6:
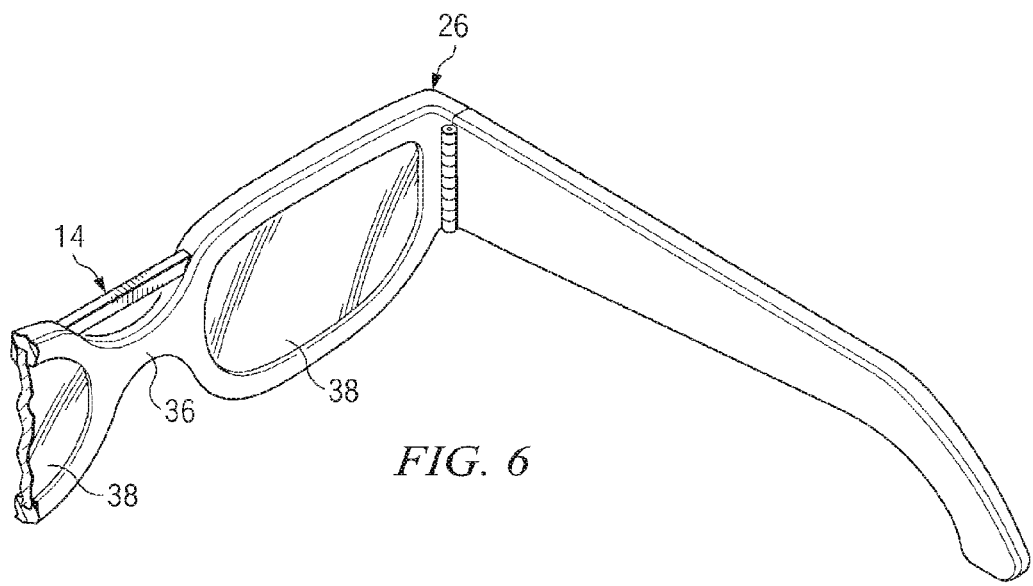
FIG. 6 is a rear perspective view illustrating another embodiment of the invention.

FIG. 6 is a rear perspective view illustrating another embodiment of the invention wherein the bottle opener 14 is positioned above the nosepiece 36 of the frame 26 that connects the portions of the frame 26 that hold the lenses 38.

Figure 7:
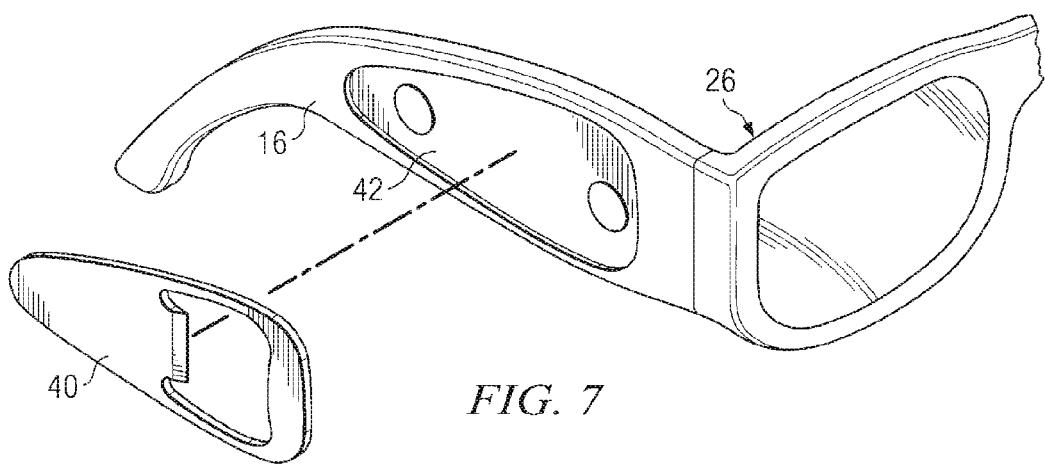
FIG. 7 is a perspective view illustrating another embodiment of the invention.

FIG. 7 is a perspective view illustrating another embodiment of the invention wherein a bottle opener 40 is a separate piece that is attached to the earpiece 16 of the frame 26 via a magnet 42 or other means such as hook-and-loop fasteners.

Figure 8:
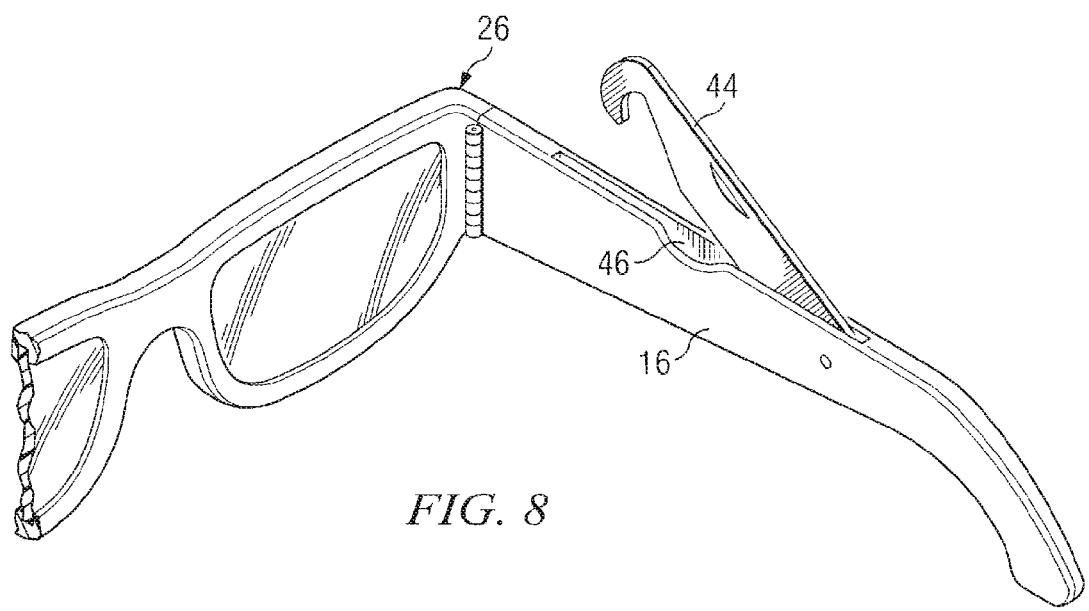
FIG. 8 is a perspective view illustrating yet another embodiment of the invention.

FIG. 8 is a perspective view illustrating yet another embodiment of the invention wherein a bottle opener 44 is housed within a housing 46 in the earpiece 16 of the frame 26 such that the bottle opener 44 may be rotated out of the housing 46 for use.

Figure 9:
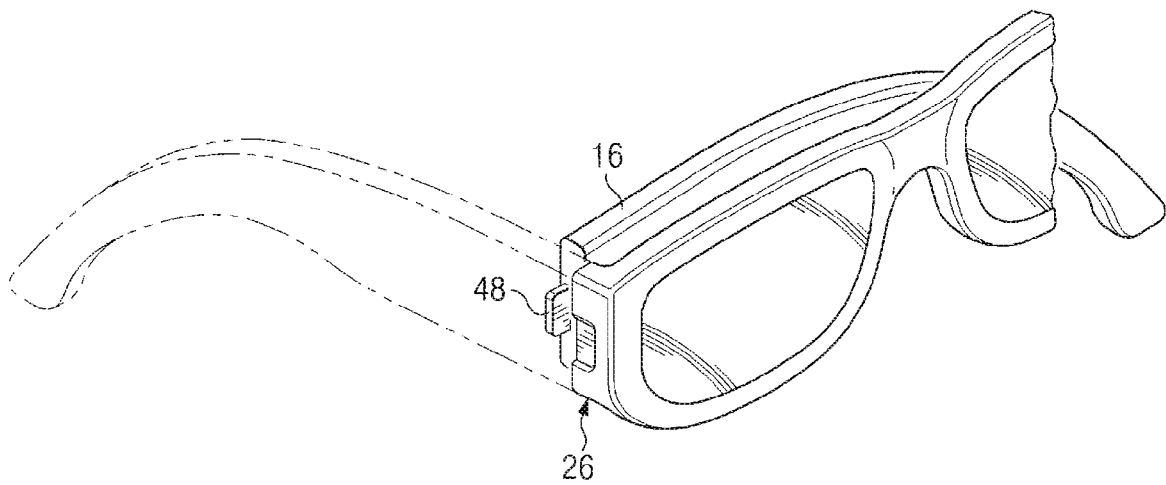
FIG. 9 is a perspective view, partially shown in phantom, illustrating yet another embodiment of the invention.

FIG. 9 is a perspective view, partially shown in phantom, illustrating yet another embodiment of the invention wherein a bottle opener 48 is formed at the hinge 28 of the frame 26 upon the folding of the earpiece 16. Upon the folding of the earpiece 16, the portion of the bottle opener 48 attached to the earpiece 16 is exposed, so as to be inserted below a bottle cap for opening.

Although preferred embodiments of the invention have been illustrated in the accompanying Drawings and described in the foregoing Detailed Description, it will be understood that the invention is not limited to the embodiments disclosed, but is capable of numerous rearrangements, modifications, and substitutions of parts and elements without departing from the spirit of the invention.

The invention claimed is:

1. An eyewear bottle opener, comprising:
   a first and a second lens;
   a frame for securing the lenses and positioning the lenses before an individual's eyes;
   two hinges attached to the frame, one hinge substantially near the first lens and the other hinge substantially near the second lens;
   an earpiece attached to each hinge for securing the frame about the individual's head;
   at least one bottle opener having a lever for opening bottles; and
   a reinforced housing within an earpiece for receiving the bottle opener.

2. The eyewear bottle opener of claim 1 wherein the at least one bottle opener is positioned within the top portion of an earpiece.

3. The eyewear bottle opener of claim 1 wherein the at least one bottle opener is positioned within the side portion of an earpiece.

4. The eyewear bottle opener of claim 1 wherein the at least one bottle opener is positioned within the end portion of an earpiece.

5. The eyewear bottle opener of claim 1 wherein the at least one bottle opener is positioned within the bottom portion of an earpiece.

6. The eyewear bottle opener of claim 1 wherein the at least one bottle opener is housed within a housing in an earpiece such that the bottle opener can be rotated out of the housing for use.

7. The eyewear bottle opener of claim 6 wherein the at least one bottle opener rotates upwardly out of the housing.

8. The eyewear bottle opener, comprising:
   a first and a second lens;
   a frame for securing the lenses and positioning the lenses before an individual's eyes;
   two hinges attached to the frame, one hinge substantially near the first lens and the other hinge substantially near the second lens;
   an earpiece attached to each hinge for securing the frame about the individual's head; and
   at least one bottle opener having a lever for opening bottles.

9. The eyewear bottle opener of claim 8 wherein the at least one bottle opener is positioned above a nosepiece of the frame.

10. The eyewear bottle opener of claim 8 wherein the at least one bottle opener is a separate piece that attached to an earpiece.

11. The eyewear bottle opener of claim 10 wherein the at least one bottle opener magnetically attaches to an earpiece.

12. The eyewear bottle opener of claim 8 wherein the at least one bottle opener is housed within a housing in an earpiece such that the bottle opener can be rotated out of the housing for use.

13. The eyewear bottle opener of claim 12 wherein the at least one bottle opener rotates upwardly out of the housing.

14. The eyewear bottle opener of claim 8 wherein the at least one bottle opener is formed at a hinge attached to the frame upon the folding of an earpiece, thereby exposing a portion of the bottle opener attached to the earpiece so as to be inserted below a bottle cap for opening.

\* \* \* \* \*

UNITED STATES PATENT AND TRADEMARK OFFICE
CERTIFICATE OF CORRECTION

PATENT NO.         : 7,367,670 B2                                                Page 1 of 1
APPLICATION NO. : 11/691567
DATED                 : May 6, 2008
INVENTOR(S)       : Travis E. Duane It is certified that error appears in the above-identified patent and that said Letters Patent is hereby corrected as shown below:

Col. 1, line 53, replace "bottle open is" with -- bottle opener is --.
Col. 2, line 9, replace "that attached about" with -- that attaches about --.

Col. 4, Claim 10, line 28, replace "that attached to an" with -- that attaches to an --.

Signed and Sealed this

Seventeenth Day of March, 2009

JOHN DOLL
*Acting Director of the United States Patent and Trademark Office*